United States Patent [19]

Oltmanns et al.

[11] 4,072,453
[45] Feb. 7, 1978

[54] PLANT FOR THE PRODUCTION OF TUBULAR OR HOSE-LIKE ARTICLES OF SYNTHETIC MATERIAL

[75] Inventors: Heinrich Oltmanns, Jeddeloh; Klaus Volckmann, Bad Zwischenahn, both of Germany

[73] Assignee: Ziegelwerke Heinrich Oltmanns, Oldenburg, Germany

[21] Appl. No.: 713,337

[22] Filed: Aug. 11, 1976

[30] Foreign Application Priority Data

Aug. 21, 1975  Germany .............................. 2537184

[51] Int. Cl.$^2$ .............................................. B29C 3/02
[52] U.S. Cl. ...................................... 425/62; 198/952; 425/88; 425/290; 425/327; 425/370; 425/371

[58] Field of Search .................. 264/209, 284; 425/62, 425/88, 327, 370, 392, 393, 396, 371, 329, 224, 223, 471, 384, 404, 445, 376 R, DIG. 108, DIG. 200, DIG. 201, 372, 290; 198/952; 432/77, 235; 165/86

[56] References Cited

U.S. PATENT DOCUMENTS 3,891,007  6/1975  Kleykamp ..................... 425/396 X

FOREIGN PATENT DOCUMENTS 569,737  11/1957  Italy ..................................... 425/327
802,261  10/1958  United Kingdom ................... 425/62

*Primary Examiner*—Francis S. Husar
*Assistant Examiner*—Mark Rosenbaum
*Attorney, Agent, or Firm*—Andrus, Sceales, Starke & Sawall

[57] ABSTRACT

A mobile plant for manufacturing corrugated drain pipe includes an extrusion apparatus, a pipe molding means and a coiling machine for coiling up the extruded pipe. The apparatus may conveniently be mounted in a trailer for transport.

11 Claims, 5 Drawing Figures

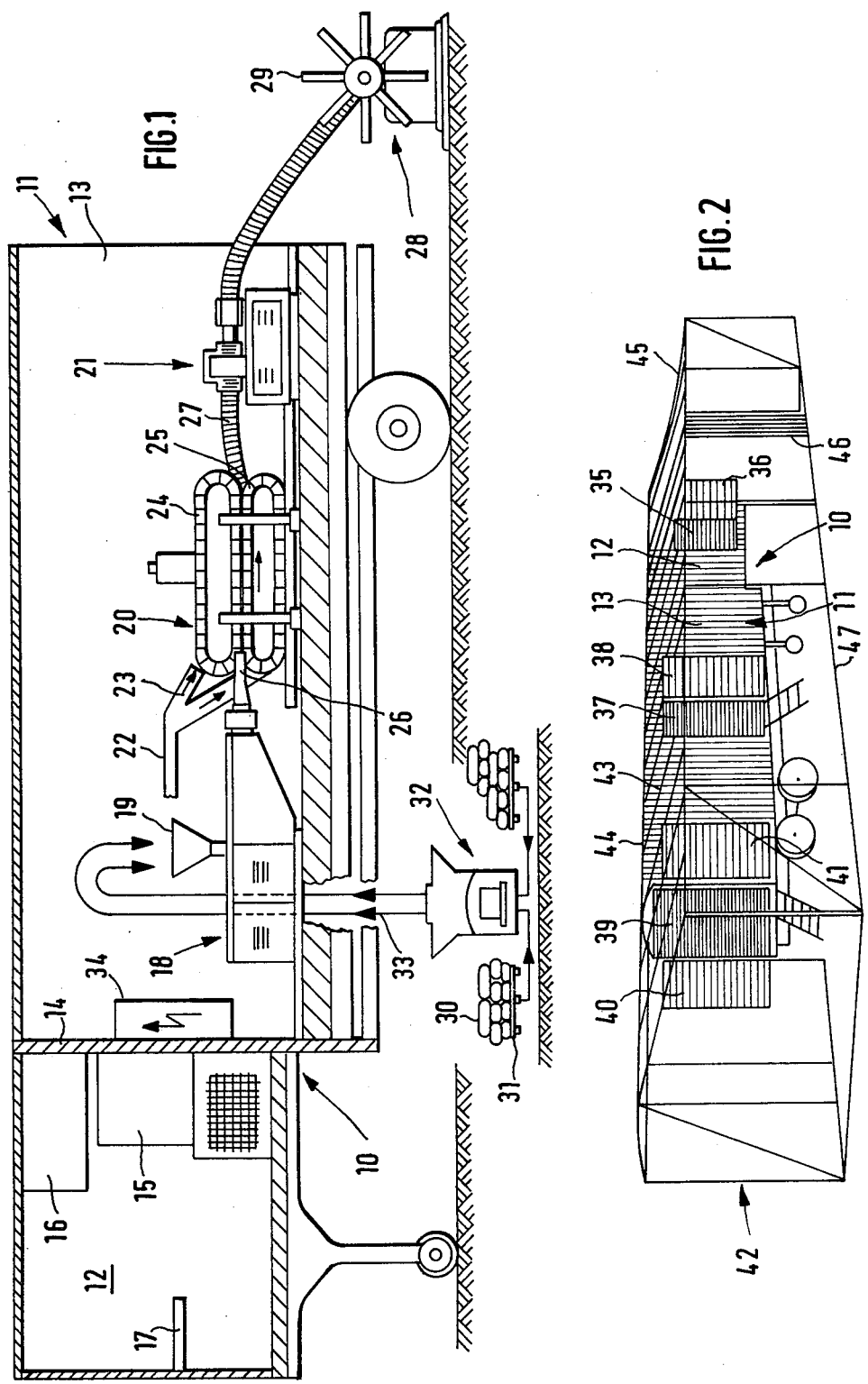

PLANT FOR THE PRODUCTION OF TUBULAR OR HOSE-LIKE ARTICLES OF SYNTHETIC MATERIAL

BACKGROUND OF THE INVENTION

The invention relates to a plant for the continuous production of tubular or hose-like articles of synthetic material, especially corrugated pipes for draining purposes, comprising an extrusion apparatus having the synthetic material supplied thereto via a feeding means, a forming device series-arranged to the extruder, preferably a mold chain, which is driven by a driving means, a driven coiling machine series-arranged to the forming device, for coiling up the extruded articles on reels or the like, and a source of electrical energy to supply the extruder, the forming device and the coiling machine with energy.

Such a plant for the production of corrugated pipes for draining purposes, for example, is known. The extruder continuously extrudes a hose of a predetermined diameter which is accommodated by a mold chain, wherein a corrugation is formed in the hose and the necessary cooling is effected at the same time. With such mold chains the mold halves or dies are respectively arranged in a loop and pivotally connected with each other, said loops being normally arranged one above the other, so that the closing of the individual molds each time takes place in the center of the arrangement. Such mold chains are likewise known and make possible a continuous forming of the corrugations, while at the same time serving as a withdrawing means for the extruded hose. After having been shaped in the mold chain, the punching of holes is performed in the corrugated tube prior to being then coiled up on a drum or reel with the aid of a coiling device.

The packs of corrugated tubes produced in this manner in the form of rings are subsequently transported to the site for use, i.e. to the field or the area which is to be drained. Normally, the rings are then taken over by a drain plough continuously placing the corrugated drainpipe in the ground without any interruption. The drainpipes suffer from a drawback insofar as they require a transport volume of an extreme order of size. For this reason they are normally transported by special transport vehicles. In countries and areas having a good infrastructure the transport of coiled-up corrugated pipes hardly poses any problems and may be accomplished at reasonable expenditure in terms of transport costs. Problems, however, especially occur in places where there are neither any roads nor ways, and if there are any, they are in a bad state, such as for instance in southern countries and, in those regions, especially in desert areas. On the other hand, in an effort of opening up wilderness and desert areas, in particular, draining measures are taken for desalting puroses, for example. As, now, these areas can hardly be travelled on with the usual transport vehicles, the supply of drainage pipes to these areas constitutes an almost insurmountable problem.

SUMMARY OF THE PRESENT INVENTION

The invention is therefore based on the problem of providing means with the aid of which the supply of synthetic material drainage pipes to an area to be drained is facilitated.

This problem is solved with a plant of the type mentioned at the beginning in that the extruder and the forming device including the driving means are arranged on a common platform with the platform being provided with a chassis to which a tractor may be coupled.

The invention proceeds from the idea that the finished tube of synthetic material has a volume about 10 to 12 times that of the amount of granulated synthetic material necessary for the production thereof. Besides, the latter is not bulky and therefore may be transported much more simply and easily than the bulky rings of synthetic material pipes. It will therefore be possible even in pathless areas to supply the synthetic material for a relatively large amount of tubes to be produced at relatively moderate expenses.

It is made possible to overcome the transport problem through the plant in accordance with the invention in which the extruder and the forming device are arranged in common on a mobile chassis and may in this manner be respectively driven to any desired site where they are to be used. Besides, the plant according to the invention offers the advantage that very large rings may be produced with the aid of huge reels or the like which are not suited for normal transport otherwise.

As the mobile production plant in accordance with the invention is intended for use in the open, provision is made in one embodiment of the invention for the platform to possess a house-like superstructure with at least one rear opening preferably adapted to be closed by means of a door and with the outlet of the forming device facing towards said opening. In operation the extruded hose is passed out through the opening and on to the coiling machine which is preferably arranged separately on the ground.

In this connection, provision is made in a further embodiment of the invention for the housing superstructure to have at least one lateral opening in the neighbourhood of the extruder preferably adapted to be closed by means of a door. Through this opening the extruder is accessible directly from outside to perform maintenance or repair work, for example.

In other embodiment of the invention provision is made for the source of energy to be in the form of a portable generator arranged on the platform, which is adapted to be driven by means of a fuel-operated motor likewise arranged on the platform. With this measure the invention allows for the fact that just in those areas of application for which the invention has been conceived, connection to public mains of current supply is not possible or is possible only at considerable expenses. Through the arrangement of a gas generator the plant in accordance with the invention is independent of outside sources of energy and may be operated automatically. The driving motor preferably is a diesel engine or gasoline engine with the fuel tank preferably being likewise arranged on the platform. As the extruder, as is well known, must not be switched-off suddenly, provision is preferably made also for an emergency current supply in case the main current supply should fail.

Another embodiment of the invention provides for the housing superstructure to be composed of two compartments disposed longitudinally one after the other and separated from each other, with the generator arranged in its own compartment together with the driving motor. Through this arrangement, a separation is effected between the place of production and the energy supply, in which arrangement the compartment accommodating the generator may advantageously be designed as a workshop at the same time, having its own access opening adapted to be closed by means of a door. The platform furthermore is advantageously designed in the form of a trailer for a truck-and-trailer arrangement. The compartment accommodating the generator with the driving motor preferably is accommodated at the end adjacent the engine, while the other compartment is accommodated in the rearward portion.

The granulated synthetic material is charged into the extruder via a feeding means. In this connection, provision is made in another embodiment of the invention for the feeding means to be arranged outside the platform and to be connected with the extruder via a conveying means. Normally, it is advantageous to store the granulated synthetic material which is supplied in sacks or the like outside the mobile plant. Therefore, it is more advantageous for the charging with the synthetic material if the supply or feeding means is arranged outside the platform and a conveying means is provided by means of which the charging of the extruder may be performed. For this purpose the conveying means in accordance with the invention is provided with a flexible conveying screw which may be passed, for example, through an opening of its own in the superstructure housing wall.

In a further embodiment of the invention provision is made for the housing superstructure to be designed in the form of a support for a tent structure. To provide a tent beside the platform comprising the housing superstructure offers the advantage that the synthetic material may be stored in a dry condition and the coiling machine as well as the feeding means are not exposed to influences of bad weather. Owing to the measure taken in accordance with the invention the tent forms a so-called lean-to tent, with the roof poles inserted, for example, in openings formed at the upper longitudinal edge of the housing superstructure.

For reasons connected with manufacturing technique cooling of the forming device is desired in most cases. It has already become known to provide a cooling fan for cooling a mold chain. The effectiveness of a cooling fan, however, is often not sufficient, the more so with uses under increased ambient temperatures. Provision is therefore made in one embodiment of the invention for a cooling apparatus to be arranged on the platform for cooling the forming device in a self-contained circuit. Such a cooling arrangement is absolutely independent of any natural cooling media available, such as air or water or the like.

In connection with the cooling of the forming device provision is made in a further embodiment of the invention for the individual forming dies to comprise cooling passages when a mold chain is used, and for two self-contained flexible passage loops co-rotating with at least one chain loop, one of which being connected via a rotatable coupling to the drain, and the other one connected to the supply of the cooling aggregate, likewise via a rotatable coupling, the first passage loop being respectively connected to a cooling passage inlet and the second passage loop being respectively connected to a passage outlet at the respective forming die. Water cooling of plastics molds is generally known. With movable molds, as with mold chains, however, it has not been employed as yet, because of the problem above all of accomplishing the supply and discharge of the cooling medium to and from the individual movable dies, respectively. With the features of the cooling arrangement according to the invention the mold dies of one loop and the cooling passages thereof, respectively, are connected in parallel with two loops of cooling passages which rotate in synchronism with the mold chain and, therefore, are preferably fastened at the mold dies proper. As the mold dies are constantly moving on a self-contained circuit, a line coupling is furthermore provided through which the connection lines which lead to the cooling aggregate are connected with the loops of cooling passages or lines.

The design of the cooling aggregate may be of any conventional type and forms not part of the invention.

Owing to the constantly rotating loops of cooling lines also the connecting points of the loops of cooling lines with the connecting lines are moving. In order to avoid entanglements or other disturbing influences on these supply lines, provision is finally made in one embodiment of the invention for flexible lines to be arranged between the rotatable line coupling and the cooling aggregate, which are retained at one arm of a pivotal lever, while a tension spring or a weight engages at the other end of said lever.

BRIEF DESCRIPTION OF THE DRAWING

In the following the invention will be described in more detail by way of the accompanying drawings, wherein, FIG. 1 shows a diagrammatic side view of the construction of the plant according to the invention, FIG. 2 a perspective view of the chassis including the housing superstructure of the plant according to the invention, with lean-to tent structure, FIG. 3 a perspective view of a portion of the mold chain, FIG. 4 a front view of a mold die of the mold chain according to FIG. 3, FIG. 5 a schematic view of the cooling arrangement of a mold chain according to FIG. 3.

DETAILED DESCRIPTION OF THE PREFERRED EMBODIMENT

Figure 3:
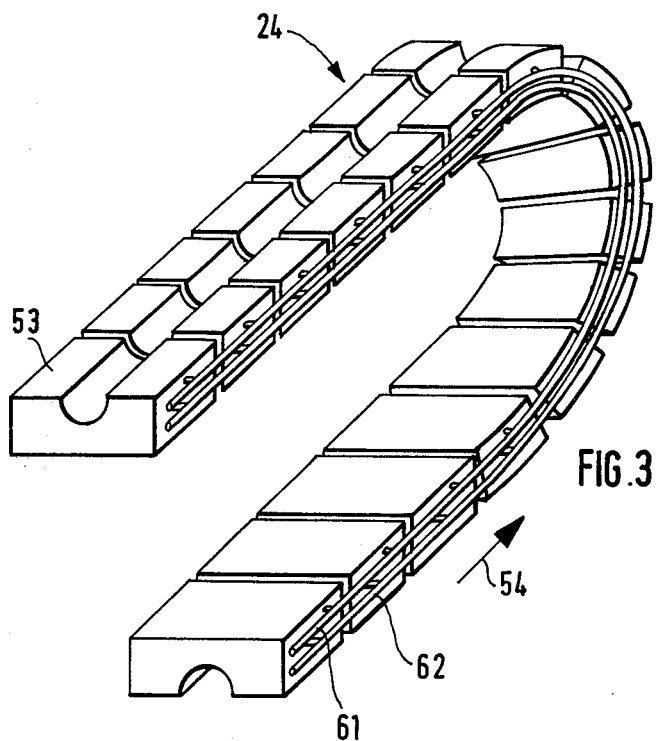
Figure 4:
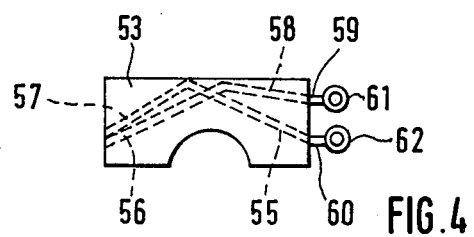

In FIG. 1 a trailer 10 of a truck and trailer assembly comprises a box type superstructure 11 having a forward compartment 12 and a rearward compartment 13. A partition wall 14 separates these two compartments 12, 13. Compartment 12 which is arranged above the supported portion of the trailer 10, comprises a generator 15 which is driven from a fuel-operated driving motor (not shown). At the ceiling of compartment 12 there is arranged a tank 16 for the fuel.

In compartment 12 there is also provided a work bench 17.

In the larger compartment 13 of the box type superstructure 11 there are arranged an extruder 18 with filling hopper 19, a forming device 20 as well as a punching device 21. A fan tube 22 divides at 23 in order to cool the forming device 20 consisting of an upper and lower mold chain 24 and 25, respectively.

A tube 26 extruded from the extruder 18 is seized in this forming machine 20 and withdrawn, while being cooled and provided with a corrugation in this operation at the same time, so that at the end a corrugated tube 27 leaves the forming device 20 and is provided with apertures in the rotating punching device 21. The corrugated tube 27 is coiled up on a reel 29 by means of a coiling machine 28 arranged outside compartment 13.

The granulated synthetic material which is stored in sacks 30 on pallets 31 outside the box type superstructure 11 is supplied to the filling hopper 19 via a feeding means 32 in the direction of the arrows 33 which are meant to indicate a flexible conveying screw.

All the parts to control and supervise the individual components within the plant are housed in a switch cabinet 34.

From FIG. 2 the exterior construction of the box type superstructure 11 may be seen in more detail. The walls 12 and 13 consist of aluminum sheet metal with an insulating coating, likewise the ceiling, with openings to admit light closed with synthetic material, however, recessed thereinto. The front compartment 12 is provided with a lateral opening 35 having a single-sashed door 13. The larger compartment 36 is provided with a lateral opening 37 which may be closed by means of a single-sashed door 38. The rear end of the compartment 13 is opened at 39 over the entire width and height thereof and is adapted to be closed by two door sashes 40, 41.

The box type superstructure 11 serves at the same time as a holding means for a tent structure 42 comprising roof poles 43. The latter have one end thereof locked at the upper edge 44 of the facing side of the box type superstructure 11. For this purpose there are openings or similar means provided in the box type superstructure 11, in order to fasten the roof poles 43 which are adapted to be fastened at a horizontal rod 45 by the opposite end thereof. Struts 46 support the rod 45 vertically, resting in their turn on a ground rod 47. The tent structure 42 may be tautly covered with a transparent tarpaulin or foil, respectively, so that a working space is formed directly adjacent the box type superstructure 11, wherein perhaps the winding or coiling machine 28 and the feeding means 32 (FIG. 1) may be accommodated in order to protect them from influences of the weather. The inclusion of the box type superstructure 11 in the tent structure 42 results in a saving of material expenditure for the tent structure and, besides, in an extremely stable support against very severe influences of the wind.

Figure 5:
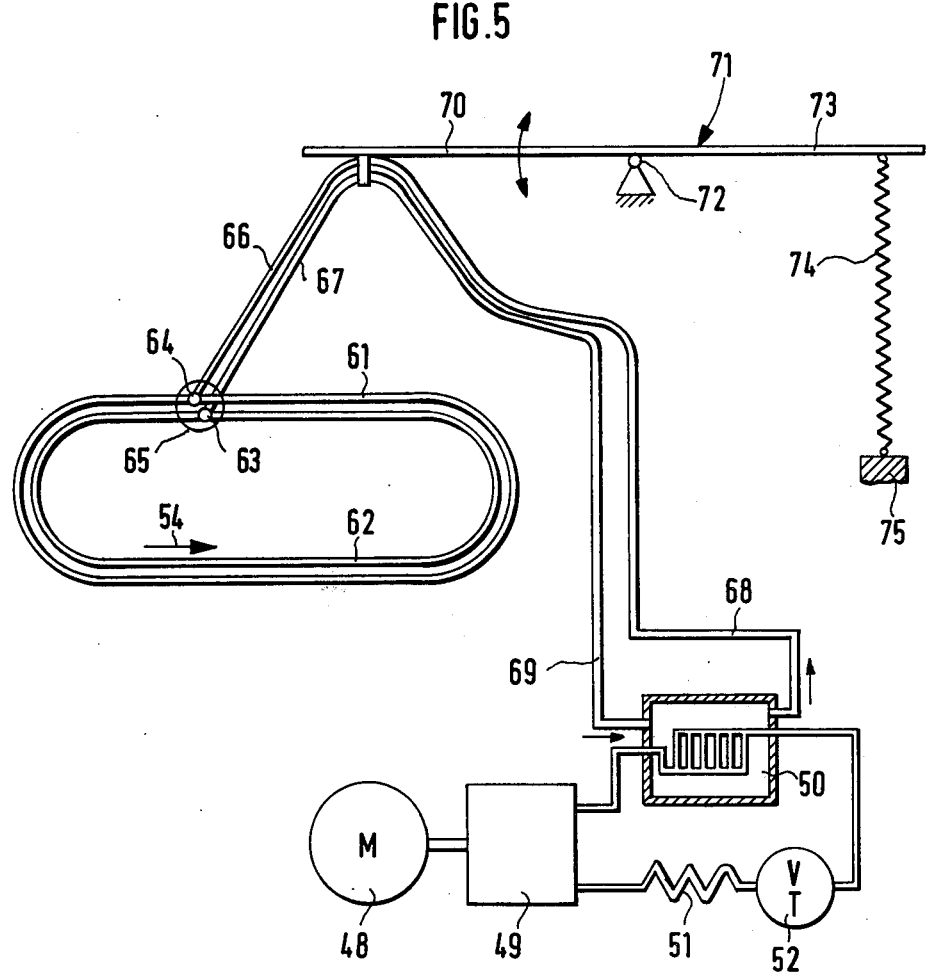

FIG. 5 shows the fuel motor which drives the generator 15 in compartment 12, said motor not being shown in connection with FIG. 1, and here referenced 48. This motor drives a compressor 49 of a cooling circuit consisting of an evaporator 50, a condensor 51, and a throttle valve 52. The individual forming dies of the forming device 20 are cooled with the aid of the evaporator, as will be described in more detail in the following.

In the following, the cooling operation will be described only for the upper mold chain 24. It goes without saying that the lower mold chain 25 may be approached to a cooling apparatus in the same manner.

The mold chain 24 consists of individual mold dies 53 arranged in a series one after the other which are rotating in the direction of the arrow 54. For this purpose the individual mold dies 53 are pivotally connected with each other. The suspension thereof as well as their drive are not to be described here. As also the mode of operation of such mold chains is known it is also refrained from enlarging thereon here in any more detail.

Each individual mold die 53 which constitutes one mold half is connected with cooling passages which are formed by individual bores 55 to 58. The position of the bores 54 to 58 shown in the drawing in dash-dotted lines may be selected as desired, the one shown in the drawing being meant only as an example. The bores 55 to 58 are closed at the ends except at the connections 59, 60, with the bores 56 and 57 communicating with each other through a transverse bore (not shown). Thereby, a closed cooling passage is formed, with the connection 59, for example, constituting the inlet and the connection 60 constituting the outlet. The bores 55 to 58, besides, are arranged in such a manner that they surround the respective half of the mold cavity in a V-shape in order to guarantee a cooling of this portion as effective as possible.

A flexible line 61 or 62 is respectively connected with the individual connections 59 and 60 of the individual mold dies 53. The lines 61 and 62 carry a cooling medium and connect the cooling pasages of all the mold dies 53 of the mold chain in parallel.

From FIG. 5 it may be seen that the flexible lines 61, 62 form self-contained loops of lines. They each comprise a hose coupling 63 and 64, respectively, which are preferably formed by one unit as indicated by the circle 65. The coupling unit 65 makes possible a rotatable connection of flexible supply lines 66, 67 to the cooling passages 61, 62 during their constant rotation. The flexible lines 66, 67 which are connected with an outlet line 68 of an inlet line 69, respectively, of the evaporator 50 are retained at one arm 70 of an oscillating lever 71 which is pivotally supported at 72. A tension spring 74 engages at the other arm 73 of the oscillating lever 71 which is retained stationary at 75 by the other end thereof. The oscillating lever 71 enables the flexible lines 66, 67 to follow the constant rotary movement of the coupling unit 64 connected therewith in the direction of the arrow 54.

We claim:

1. A mobile unit for the continuous production of plastic tubes, particularly corrugated tubes for draining purposes, comprising:
    an elongated, wheeled, vehicular platform (10) having an enclosure (11) mounted thereon and enclosing same;
    an extruder (18) for plastic material mounted on said platform;
    a molding device (20) mounted on said platform, said molding device including a pair of rotatable loops (24, 25) of chainlike connected dies (53) abuttable along a common rectilinear portion located at the output of said extruder;
    mold cooling means including cooling passages (55-58) in said dies having inlets and outlets (59, 60), a pair of loops of flexible cooling lines (61,62), one of said cooling lines being connected to said inlets and the other of said cooling lines being coupled to said outlets of said cooling passages, said pair of loops of cooling lines being rotatable with said loops of dies, and swivelable coupling means operatively associated with said rotatable cooling lines (65) for connecting said rotatable cooling lines to a stationary source of coolant (50);
    a punching device (21) mounted on said platform at the output of said molding device for applying apertures to the extruded and molded tube; and
    power supply means (15) energizing said extruder, said molding device, said mold cooling means, and said punching device.

2. The unit according to claim 1 having at least one rearward opening (39) adapted to be closed by means of a door (40,41) with the exit of the molding device (20) facing said opening (39).

3. The plant according to claim 1, characterized in that the power supply means is a portable generator (15) arranged on the platform (10) which is adapted to be driven by a fuel-operated motor likewise arranged on the platform (10).

4. The unit according to claim 1, characterized in that the platform is designed with a chassis as a trailer (10) in a truck-and-trailer unit.

5. The unit according to claim 1, characterized in that the inlets and outlets (59, 60) of the cooling passages are disposed on one and the same side of the mold dies (53) and the loops of cooling lines (61, 62) are fastened to the mold dies (53).

6. The unit according to claim 5, characterized in that there are flexible lines (66, 67) arranged between said swivelable coupling means (65) and said source of coolant (50) which are retained at one arm (70) of an oscillating lever (71) while a bias means (74) engages at the other arm (73).

7. The unit according to claim 1 wherein said enclosure is divided into front and rear subcompartments (12, 13) arranged in tandem in the direction of elongation on said platform and separated by a partitioning wall (14), wherein said extruder, molding device, mold cooling means and punching device are mounted in said rear compartment, wherein said power supply means comprises an electrical generator and a combustion engine driving said generator and wherein said generator and engine are located in said front compartment.

8. The unit according to claim 1 further characterized as including a supply means (32) outside said enclosure for supplying plastic material to said extruder.

9. The unit according to claim 8, characterized in that the supply means (33) includes a flexible conveying screw.

10. The unit according to claim 1 wherein said enclosure is suitable for supporting an adjacent tent structure.

11. The unit according to claim 10 characterized in that there are provided in the region of the upper longitudinal edge of the enclosure (11) fastening means for receiving the ends of roof poles (43) for said tent structure.

* * * * *